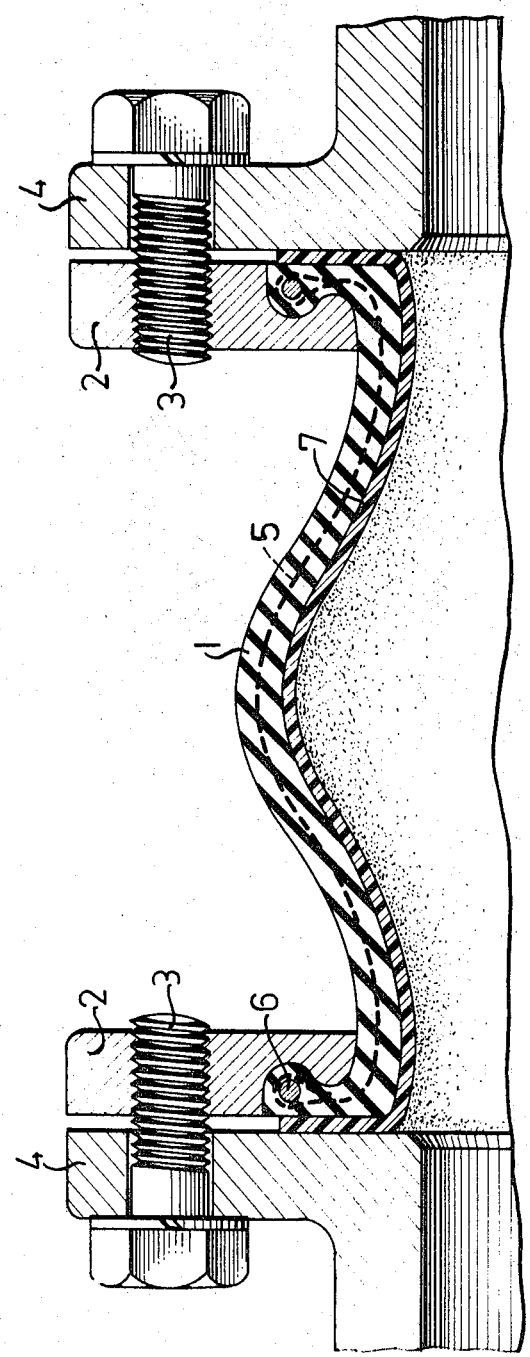

United States Patent Office 3,552,776
Patented Jan. 5, 1971

3,552,776
DEFORMABLE PIPE CONNECTOR

Werner Leymann, Hannover-Linden, Germany, assignor to Continental Gummi-Werke Aktiengesellschaft, Hannover, Germany Filed Apr. 18, 1969, Ser. No. 817,373
Claims priority, application Germany, Apr. 23, 1968, 1,750,343
Int. Cl. F16l 55/00
U.S. Cl. 285—16 2 Claims

ABSTRACT OF THE DISCLOSURE

A pipe connector unit and method of making same, according to which a deformable pipe connector body of a bellows-like shape with reinforcing insert means therein has loosely detachably inserted therein a lining body which is detachably clamped at its end flanges to the end flanges of the connector body, said lining body and said connector body forming individual separate bodies.

The present invention concerns bellows-like pipe connectors which are made of rubber or rubber-like elastic synthetic material with embedded reinforcing inserts and an inner lining resistant to the medium flowing therethrough. Such pipe connectors are fastened to the pipe ends by means of angled-off marginal beads.

It is known to provide elastic pipe connectors with inner linings of corrosion resistant materials as they are usually found in pipe construction to compensate for heat expansion, discrepancies in alignment, axial misalignments, and to absorb vibrations. Depending on the intended use, such as for conveying mineral oils, dyes, chemical fluids or beverages, various materials may be considered, for instance polyamide, fluorocarbons, or other synthetic materials. The provision of an inner lining causes a complication in production when shaping the unfinished connectors and forces a changeover in the operational flow of work which, in view of the respective conditions to be taken into consideration, can only be laid out from case to case.

It is an object of the present invention to provide a deformable pipe connector which will overcome the above mentioned drawbacks.

This object and other objects and advantages of the invention will appear more clearly from the following specification in connection with the accompanying drawing showing a longitudinal section of a pipe connector according to the invention.

According to the invention, a pipe connector of the above mentioned type is characterized primarily in that the inner lining is individually produced as molded body adapted to the contour of the inner wall of the pipe connector when the latter is in a tension-free state; the inner lining is inserted exchangeably loose in the pipe connector. For purposes of fixation, the lining is advantageously formed with flange-like end faces bent around marginal beads. Thus the lining can be held between the marginal beads of the pipe connector and the associated pipe end. The invention turns away from the adhesive connection between the lining and the inner wall of the pipe connector which has heretofore been considered necessary, and combines the fitting out of a pipe connector with such a lining with the assembly of the connector.

The pipe connectors as such may be produced in conformity with customary processes and do not have to take into consideration the particular aggressive liquids which are to be passed through the respective conduit systems. The selection of a certain lining remains open and, depending on the respective conditions, that lining can be selected and used in connection with the main body of the connector which is necessary in the particular instance. The advantage of the invention thus consists primarily in a simplified production and a more universal application of the pipe connector according to the invention.

SUMMARY OF THE INVENTION

Comparatively readily deformable bellows-type coupling pieces prefabricated and kept interchangeably available are provided between actual rigid type conduits or pipes having flange means integrally thereon. The rigid pipes and resilient foldable bellows with embedded reinforcing inserts provide flexibility and a complementary relationship of the independently prefabricated inner lining body associated therewith and progressively fabricated and assembled so as to assure interchangeability of parts regardless of utilization made thereof. The inner linings can be kept in supply or storage in differing material embodiments and can be readily paired with a completed or finished pipe connector. A juncture and holding together of the parts made independently can be established at once by way of the bellows configuration and by way of clamping between fastening flanges complementary to each other as respectively provided for the rigid and resilient parts including the pipes and lining body. Procedure for making a deformable pipe connector with inner lining includes steps of preparing the bellows-shaped connector body of elastic material with end flanges and separately preparing a lining body having an outer contour corresponding to the inner contour of the connector body when the latter is substantially free from stresses from the inside thereof while providing the lining body with end flanges respectively to fit over the end flanges of the connector body upon inserting of the linging body into the connector body.

Referring now to the drawing in detail, the pipe connector 1 illustrated therein has the shape of a bellows bulging in its central portion. This pipe connector 1 may, by means of two annular flanges 2, be loosely mounted on the two ends of the connector and by means of bolts 3 may be connected to the end flanges 4 of a pipe line. The connector may consist of natural or synthetic rubber material and has textile material or metallic reinforcing inserts 5 embedded in its wall. The reinforcing inserts 5 extend over the entire length of the core and are anchored in the core rings 6 provided in the angled off end beads. Inserted into the bellows body is a molded body 7 which as to its shape is adapted to the inner contour of the connector 1. This molded body or lining 7 consists of a synthetic material resistant to aggressive chemicals and is loosely and exchangeably inserted into the connector 1. The lining 7 which completely covers the inner wall surface of the pipe connector proper and protects the same against the medium passing through the structure is at both end faces extended over the end beads and thus directly engages the flanges 4 of the pipe line so that the lining will be fixed as to its position within the pipe connector 1 only by tightening the threaded bolts 3. Inasmuch as the lining 7 is not subjected to any stresses, no reinforcing inserts are required and the thickness of the lining has only to be a fraction of the wall thickness of the pipe connector. The lining will then form a body somewhat similar to a corrugated hose with angled off end faces.

The pipe connector according to the invention is especially suitable for absorbing inner pressures. The inner lining which has a higher shape-retaining property than rubber will, however, also be resistant to subatmospheric pressures without collapsing and without impairing the flow of the fluid passing through the pipe connector.

It is, of course, to be understood that the present invention is, by no means, limited to the particular construction shown in the drawing but also comprises any modifications within the scope of the appended claims. It may be added that the term "rubber material" covers both natural and synthetic rubber and that instead of rubber material materials may be employed for the connector, such as polyurethane, ethylene propylene copolymers or other cross-linkable resins.

What I claim:

1. A pipe connector unit which includes: a deformable pipe connector body of a foldable bellows-like shape having embedded reinforcing insert means and being provided with integral radically extending flange means for connection with the ends of pipes to be interconnected, and an independently prefabricated inner lining body detachably inserted into said connector body and having an outer contour adapted to the inner contour of said connector body when the latter is in a substantially stress-free condition and in which said lining body has its ends also provided with radially extending flange means forming a single integral piece with the remainder of said lining body and extending complementary over the flange means of said connector body, and clamping means including fastening means being associate with said flange means of said connector body for selectively and interchangeably fastening said flange means of said connector body for selectively fastening said flange means of said connector body and simultaneously therewith said flange means of said lining body to pipes to be interconnected, said flange means of said connector body terminating short of said fastening means and said flange means of said lining body having a diameter less than the diameter of said flange means of said connector body.

2. A pipe connector unit according to claim 1, in which the wall thickness of said lining body is only a fraction of the wall thickness of said pipe connector body and the lining body and pipe connector body are readily separable from each other.

References Cited

UNITED STATES PATENTS

| | | | |
|---|---|---|---|
| 2,088,922 | 8/1937 | Porteous | 285—55 |
| 2,998,986 | 9/1961 | Buono | 285—229 |
| 3,359,014 | 12/1967 | Clements | 285—229X |

FOREIGN PATENTS

| | | | |
|---|---|---|---|
| 1,253,532 | 11/1967 | Germany | 285—229 |

DAVE W. AROLA, Primary Examiner

U.S. Cl. X.R.

285—55, 229; 138—121